United States Patent [19]

Schauer

[11] Patent Number: 4,813,878

[45] Date of Patent: Mar. 21, 1989

[54] DEVICE FOR TRANSFERRING CURRENT BETWEEN TWO CONTACT POINTS WHICH ARE MOVABLE RELATIVE TO EACH OTHER

[75] Inventor: Friedrich Schauer, Heroldsberg, Fed. Rep. of Germany

[73] Assignee: Kabelmetal electro Gesellschaft mit beschränkter Haftung, Hanover, Fed. Rep. of Germany

[21] Appl. No.: 125,467

[22] Filed: Nov. 25, 1987

[30] Foreign Application Priority Data

Dec. 6, 1986 [DE] Fed. Rep. of Germany ....... 3641706

[51] Int. Cl.$^4$ .......................................... H01R 39/02
[52] U.S. Cl. ...................................... 439/16; 439/933
[58] Field of Search .................. 439/15, 16, 492, 498, 439/499, 892, 894, 933

[56] References Cited

U.S. PATENT DOCUMENTS 4,657,326  4/1987  Zeller et al. .......................... 439/16

FOREIGN PATENT DOCUMENTS 3041257  6/1982  Fed. Rep. of Germany ........ 439/15

Primary Examiner—Gary F. Paumen
Attorney, Agent, or Firm—Martin A. Farber

[57] ABSTRACT

The invention relates to a device for transferring current between two contact points which are movable relative to each other. Between the two contact points there is arranged a ribbon cable (10) which is wound in the manner of a spring housing and which is bent at its ends by folding by 90°. Over each of the folded ends of the ribbon cable (10) there is provided a prefabricated L-shaped molding (12) of stable insulating material. The cable ends are so stabilized by the moldings (12) that molding can easily be effected around them.

10 Claims, 2 Drawing Sheets

DEVICE FOR TRANSFERRING CURRENT BETWEEN TWO CONTACT POINTS WHICH ARE MOVABLE RELATIVE TO EACH OTHER

FIELD AND BACKGROUND OF THE INVENTION

The present invention relates to a device for transferring current between two contact points.

Between these two contact points there is arranged a ribbon cable which serves for the electric connection and is wound in turns concentric to each other in the manner of a spring housing, the cable having at least one electric conductor having its ends firmly attached to the two contact points, at least one of the two contact points being movable relative to the other along a path concentric to the turns of the ribbon cable, and the ends of the ribbon cable being folded so that they protrude at an angle of 90° from the ribbon cable, the end regions of the ribbon cable which contain the folded places being embedded in an insulator which is produced by extrusion, and parts being provided on the ends of the ribbon cable around the axis of which said ends are swingable (Federal Republic of Germany GM 85 05 830).

Apparatus having such devices are, for instance, coilers in which an electric cable is wound on a bobbin. The cable can be pulled out of the housing of the apparatus and be automatically rewound under the action of a spring after the release of a pulling force. The apparatus can also be an anti-rebound device for automotive vehicles in which an electric current lead is arranged in the steering wheel of an automotive vehicle. One essential problem in such devices is the transfer of the current between the fixed contact and the movable contact. This problem arises in the case of all apparati in which two contact points which are movable relative to each other are present, one of which contact points is generally developed as a fixed point. The wiper contacts or wiper rings which have been known for a long time for such cases are subject to wear and are disadvantageous because of their high contact resistances, particularly in the case of low current intensities.

In the aforementioned known device in accordance with Federal Republic of Germany GM 85 05 830, the transfer of current is effected by a ribbon cable which is wound in the manner of a spring housing. Upon a relative rotary movement of the two contact points connected by the ribbon cable the wound ribbon cable expands like the spring of a clock. The turns are pulled in one direction of rotation into a small diameter. In the other direction of rotation they return to a large diameter. This known device has the disadvantage that an insulating member which surrounds the folded ends of the ribbon cable can be produced only at great expense since the light, flexible ribbon cable very easily moves out of its central position during injection molding. The insulating members then do not uniformly surround the ends of the ribbon cable. It can even easily occur that the ribbon cable is disengaged on one side of the insulating member. Such a ribbon cable would be a complete reject. Another disadvantage of this known device is that the part of the insulating member surrounding the free end of the ribbon cable serves at the same time for a pivotal mounting of the end of the ribbon cable. This part must therefore furthermore be produced with great dimensional accuracy and at correspondingly increased expense.

It is an object of the invention to provide a device for the transfer of current by means of a ribbon cable which is wound in the manner of a spring housing and in which assurance is obtained in simple fashion that the ends of the ribbon cable are embedded in each case in a predetermined position in an insulating member produced by injection molding.

SUMMARY OF THE INVENTION

According to the invention, a prefabricated, approximately L-shaped molding (12) of a mechanically stable insulating material with flat walls (13, 14) and U-shaped cross section is arranged over the folded ends of the ribbon cable (10), the cable being at least partially surrounded by an insulating member (17). Folded free ends of the ribbon cable (10) are connected pivotally to their mounting points.

In this device, the folded ends of the ribbon cable are dependably held by the molded member. They can no longer escape from their central position upon the formation of the insulating member so that they are surrounded on all sides with uniform wall thickness by the completely molded insulating member. This result is obtained by a prefabricated molding by which the ends of the ribbon cable, which in itself is light and flexible, are so stabilized that they can be dependably held in position in a mold. Another essential advantage by which the method of manufacture is simplified consists in the fact that the ends of the ribbon cable, which are bent off by folding, need not align with an axis of pivot about a connection point. Therefore, upon the molding around these ends, no regard need be taken of a pivoting of the cable. Accordingly, no particular accuracy in dimensions is necessary at this place.

Further according to the invention the walls (13, 14) of the molding (12) have at least one recess (15, 16) which extends up to the ribbon cable (10).

Still further according to the invention, on each of the moldings (12) there is developed a sort of pin (18) around which the corresponding end of the ribbon cable (10) can pivot.

Another advantageous feature of the invention is that the sort of pin (18) is developed on each of the insulating members (17), around which pins the corresponding end of the ribbon cable (10) pivots.

Still further, the insulating member (17) can consist of a material which welds together with the insulating material of the ribbon cable (10).

Yet further according to the invention, moldings (12) and insulating member (17) can consist of different materials.

Also according to the invention, the insulating member (17) can consist of a softer material than the moldings (12).

Still according to another feature of the invention the ribbon cable (10) may comprise flat conductors.

BRIEF DESCRIPTION OF THE DRAWINGS

With the above and other objects and advantages in view, the present invention will become more clearly understood in connection with the detailed description of a preferred embodiment, when considered with the accompanying drawing, of which.

DETAILED DESCRIPTION OF THE PREFERRED EMBODIMENTS

Figure 1:
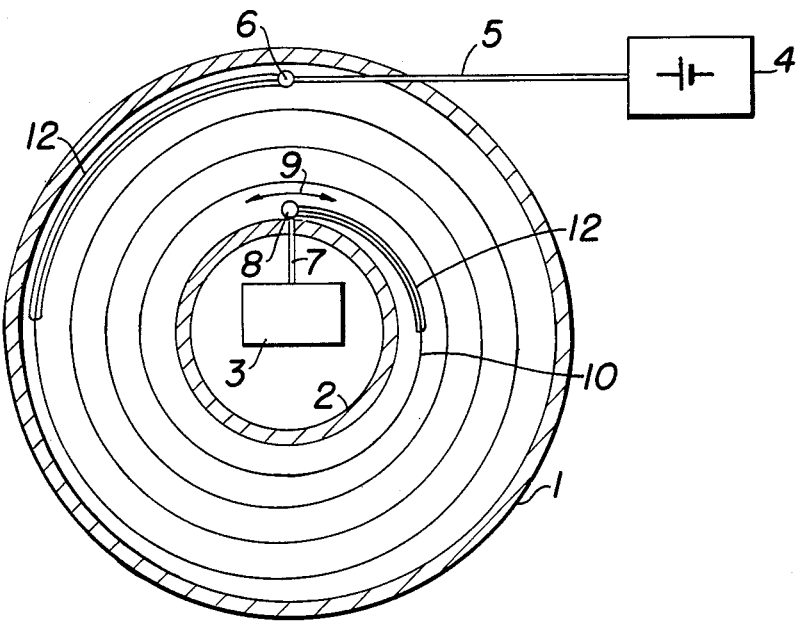
FIG. 1 is a diagrammatic cross-sectional view through an apparatus having a device in accordance with the invention.

FIG. 1 shows diagrammatically two walls 1 and 2 of the housing of an electrical device, said walls being, for instance, circular. This device can, for instance, be a control device for the rebound protection of automotive vehicles. It can be installed in the steering spindle of an automotive vehicle. For the supplying of current to an electronic system 3 of this device, the device is connected to the battery 4 of the vehicle. The battery 4 is connected by an electric cable 5 to a contact point 6 which is developed as a fixed point. The electronic system 3 is connected via an electric cable 7 to a contact point 8 which is movable in the direction indicated by the double-ended arrow 9. Between the two contact points 6 and 8 there is a ribbon cable 10 which in the following, for the sake of simplicity, will be referred to as "RC 10." The RC 10 is provided with two wires 11 in the embodiment shown. It must have at least one wire, but it may also have more than two wires, the two wires 11 being shown in FIG. 2.

The RC 10 is arranged between the two contact points 6 and 8 in a plurality of turns and therefore in the manner of a spring housing of clocks. Although the number of revolutions of a steering wheel is limited to about six, substantially more than six turns should be contemplated for the RC 10. The rotation of the contact point 8 is then not substantially noticeable for a single turn of the RC 10. The diameter of the package consisting of all turns of the RC 10 is merely reduced or increased.

Figure 2:
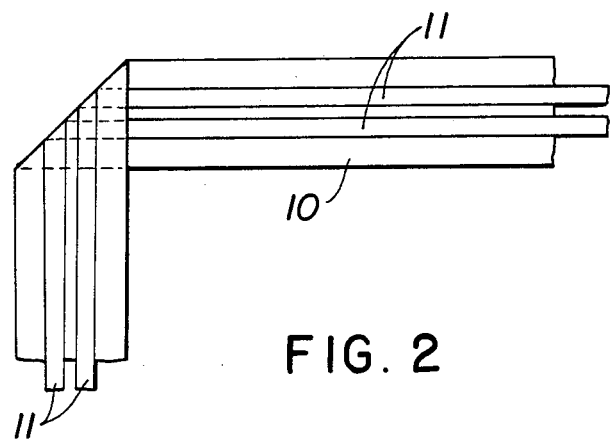
FIG. 2 shows a folded end of a ribbon cable on a larger scale.

The RC 10 is preferably provided with flat wires 11 so that a so-called flat conductor ribbon cable results. This embodiment is particularly thin because of the shape of the conductor and therefore takes up very little space. In principle, the cable could, however, also be developed with round wires. The cable ends are bent off by folding the flat ribbon cable 10 90° with respect to the ribbon cable itself, as shown in FIG. 2. The conductors 11 are available for the connecting of further wires at the free ends of the bent-off part.

Figure 3:
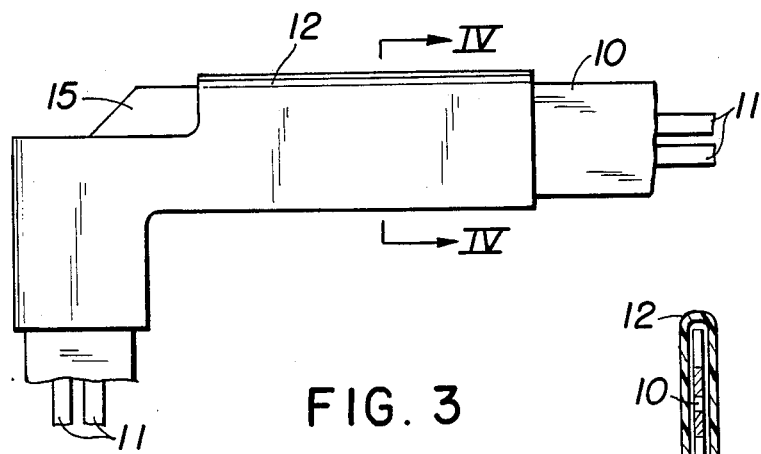
FIG. 3 shows the end of the ribbon cable with molding applied thereto.
Figure 4:
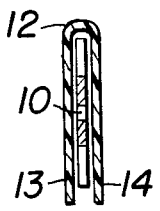
FIG. 4 is a cross section through FIG. 3 along the line IV—IV.
Figure 5:
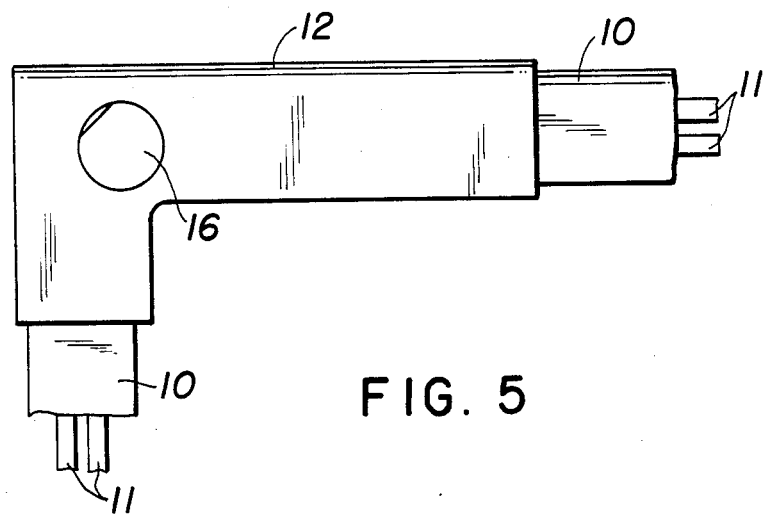
FIG. 5 is a variant embodiment of FIG. 3.

The ends of the RC 10 are surrounded by an L-shaped molding 12 in accordance with FIG. 3 in which only one end is shown. The molding 12 is a prefabricated part of approximately U-shaped cross section with flat walls 13 and 14 by which the dimensions of the RC 10 are only insignificantly increased at its ends. The molding 12 consists of a mechanically stable insulating material such as, for instance, polyamide. It is open on one side as indicated in FIG. 4 so that it can be pushed over the folded RC 10. The molding 12 can have at least in one wall 13 or 14, and preferably in both walls, a continuous recess 15, 16 through which the RC 10 is accessible. Upon the molding of an insulating member 17 around an molding 12, the material of the insulating member 17 penetrates into the recess 15 or 16 and therefore provides an additional fixing in position of the RC 10. Molding 12 and insulating member 11 can, in principle, consist of the same material. However, different materials can also be used. Thus for the insulating member 17 one can use, in particular, a material which welds together with the insulating material of the RC 10. The material of the insulating member 17 can also be softer than that of the molding 12, which can be advantageous as kink protection, particularly at the ends of the insulating member 17 from which the RC extends.

Figure 6:
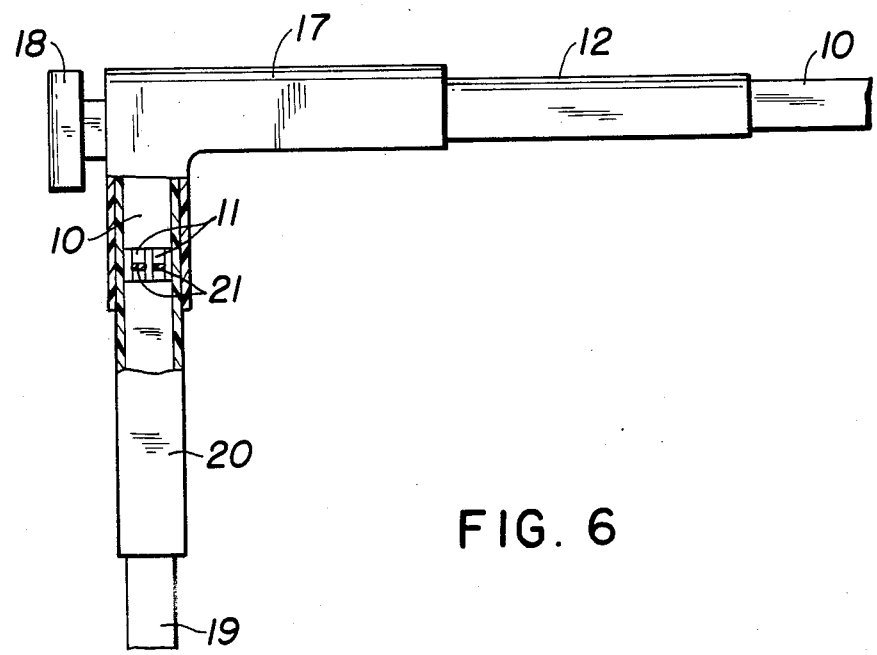
FIG. 6 is a view, partially broken away and partly in section, of an end of the ribbon cable, in finished condition.

The bent ends of the RC 10 lie, as shown in FIG. 6, displaced from pivot axes of the contact points 6 and 8. To facilitate pivoting of the ends of the RC 10, a sort of pin 18 can be provided on them, the pin 18 engaging in corresponding recesses at the contact points 6 and 8 in the housing of the device. The pin 18 can, in principle, be developed on the moldings 12. However, it is also possible to produce the pin 18 together with the insulating members 17.

The moldings 12 can extend over a greater length in the direction of the RC 10 than is necessary for the stabilizing of the ends of the conductor. They are then preferably bent in accordance with the predetermined radius of curvature of the RC 10. This lengthened region of the moldings 12 serves for a stable guidance of the RC 10 so that, upon a turning of the steering wheel and a tightening and loosening of the turns of the RC, the RC is not pushed past the points of pivot. The insulating members 17 therefore, in particular in this embodiment, cover only a part of the moldings 12.

On the bent ends of the RC 10 there can be arranged electric lines 19 which extend to further points. The lines 19 can also be developed as ribbon cables. However, it is also possible to use round conductors. In the adjoining region, protective coverings 20 of insulating material can be arranged over the bent ends of the RC 10 and over a part of the lines 19. A part of the coverings 20, which may be prefabricated pieces of hose or tubing, is preferably also surrounded by the insulating members 17. The wires of the line 19 are connected to the conductors 11 of the RC 10 at points 21 which are diagrammatically indicated. If such a place of connection is not desired, the length of the bent part of the RC 10 can be increased so that it extends directly up to the place of contact. However, even in that case a protective covering 20 is advisedly provided.

I claim:

1. In a device for transferring current between two contact points, there being a ribbon cable connected between the two contact points, said ribbon cable serving as an electric connection and being wound in turns concentric to each other in the manner of a spring housing, the cable having at least one electrical conductor having its ends firmly attached to the two contact points, and wherein at least one of the two contact points is movable relative to the other along a path concentric to the turns of the ribbon cable, there being ends of the ribbon cable which are folded to protrude at an angle of 90° from the ribbon cable, and wherein the device includes insulators, each of the ends of the ribbon cable which contain a fold of the cable being embedded in one of the insulators, the insulators being produced by molding and having parts disposed on the ends of the ribbon cable around the axes of which insulators said ends are pivotable, the device further comprising prefabricated, approximately L-shaped moldings of a mechanically stable insulating material, the moldings having flat walls and a U-shaped cross section slid over the folded ends of the ribbon cable, each molding being at least partially surrounded by one of the insulators.

2. The device according to claim 1, wherein the walls of the molding have at least one recess.

3. The device according to claim 1, wherein on each of the moldings there is a pin around which an end of the ribbon cable is pivotable.

4. The device according to claim 1, further comprising
a pin located on each of the insulators, around which pin an end of the ribbon cable is pivotable.

5. The device according to claim 1, wherein said insulator is made of a material which welds together with insulating material of the ribbon cable.

6. The device according to claim 1, wherein said moldings and insulator are made of different materials.

7. The device according to claim 1, wherein said insulator is made of a softer material than the moldings.

8. The device according to claim 1, wherein said ribbon cable comprises a flat conductor ribbon cable.

9. The device according to claim 2, wherein on each of the moldings there is a pin around which an end of the ribbon cable is pivotable.

10. The device according to claim 2, further comprising
a pin located on each of the insulators, around which pin an end of the ribbon cable is pivotable.

* * * * *